Aug. 18, 1936.            H. M. EPSTEIN            2,051,251
RETAINING MECHANISM FOR CASTERS OR THE LIKE
Filed June 26, 1935
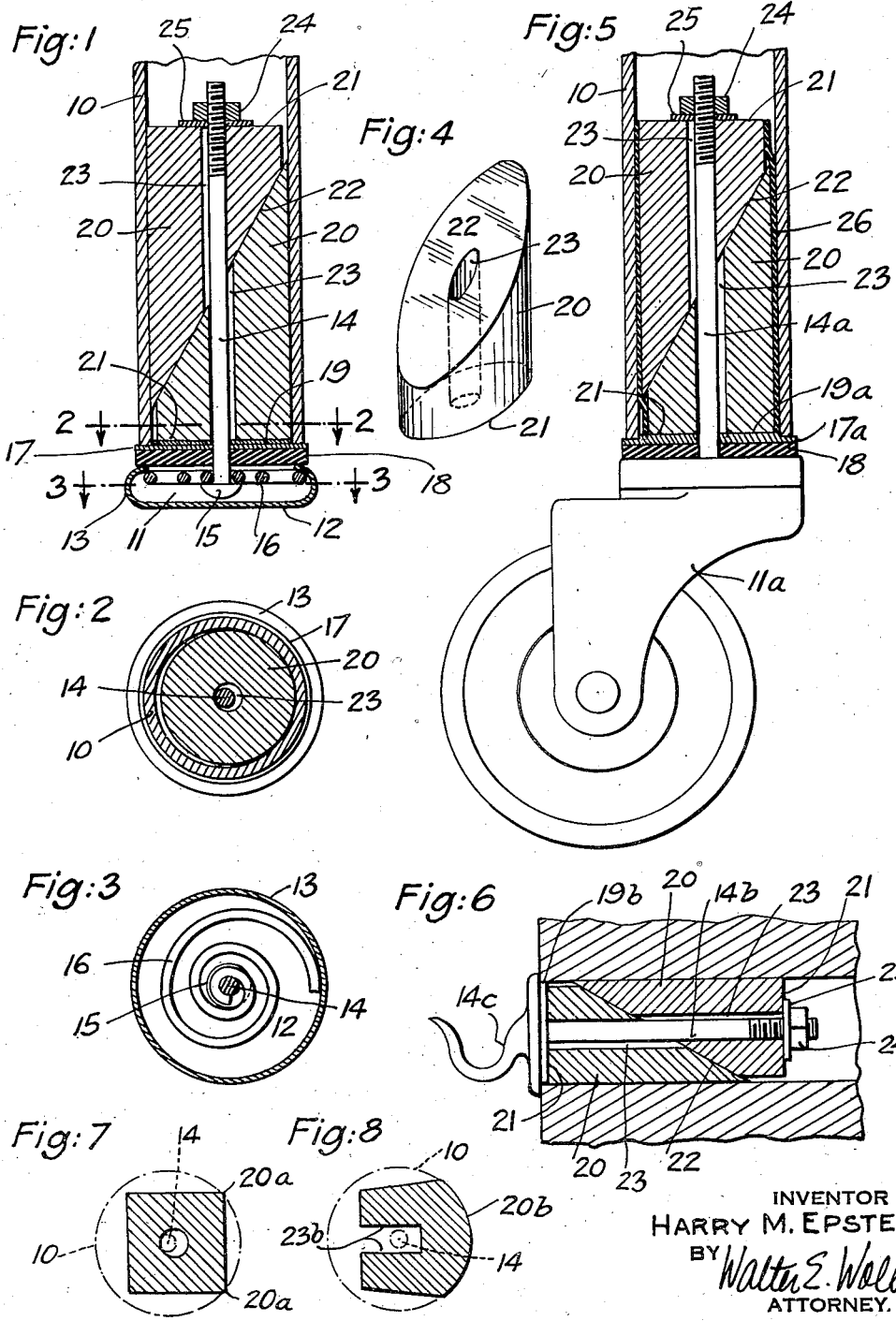
INVENTOR
HARRY M. EPSTEIN
BY Walter E. Wollheim
ATTORNEY.

Patented Aug. 18, 1936

2,051,251

UNITED STATES PATENT OFFICE 2,051,251

RETAINING MECHANISM FOR CASTERS OR THE LIKE

Harry M. Epstein, New York, N. Y.

Application June 26, 1935, Serial No. 28,462

4 Claims. (Cl. 16—38)

The invention relates to adjustable retainers for casters or the like, preferably for use in connection with tubular legs of metal furniture.

In the manufacture of metal tubing, such as ordinarily used in the construction of furniture, no attempt is made to hold the inner diameters of the tubing within close limits. It is the principal object of the invention to provide a caster with means which may be readily expanded for adjusting the same to fit the varying inner diameters of such aforesaid tubing.

Another object resides in the provision of a caster retaining device which is adaptable to securely engage the side walls of a socket and retain the caster from accidental disengagement therefrom and which is rigid in construction whereby it is capable of withstanding the usual rough usage.

A further object is to provide a mechanism which may be expeditiously inserted into a socket and which comprises a minimum number of parts resulting in economical manufacture.

Still other objects of my invention will become apparent in the following specifications and the accompanying drawing, in which Fig. 1 is a longitudinal sectional view, partly in elevation, of a preferred form of a caster having retaining means embodying the principles of my invention secured to the end of a tubular metal leg;

Fig. 2 is a cross-sectional view along the plane of line 2—2 in Fig. 1;

Fig. 3 is a cross-sectional view along the plane of line 3—3 in Fig. 1;

Fig. 4 is a perspective view of one of the wedge members of the retaining mechanism;

Fig. 5 is a longitudinal sectional view, partly in elevation, of a roller caster having a somewhat modified form of retaining means for securing it to a socket;

Fig. 6 is an application of the principles of the invention for securely fastening a hook or other element to a socket; and Figs. 7 and 8 are modified cross-sectional views of the wedge members of the device.

Like characters of reference denote similar parts throughout the several views and the following specification.

In Fig. 1, 10 is the bottom portion of a tubular metal leg of a piece of furniture. 11 is a sliding caster of cup shape having a bottom 12 and curved sides 13 of the usual construction well known in the art. A caster stem 14 having a head 15 is resiliently supported and secured to the inside curved side walls of the caster 11 by a spiral spring 16 which frictionally engages that part of the stem immediately above the head. Abutting the end of the leg 10 is a washer 17. 18 is a washer of rubber or other resilient material interposed between the washer 17 and the top of the curved sides 13 of the caster 11. 19 is a washer fitting closely within the side walls of the leg 10 and positioned immediately above the washer 17. Washers 17, 18 and 19 are centrally fitted closely over the caster stem 14.

20 are wedge members substantially cylindrical in shape having each one end 21 at right angles to its longitudinal axis, and its other end 22 in angular relation to aforesaid end 21 thus forming an oblique top to a square base, as clearly shown in Fig. 4, the ends 21 of the members contacting with each other. Each of the members 20 is bored out centrally with a hole 23 considerably larger in diameter than the caster stem 14.

24 is a nut screwed onto a threaded top of the caster stem 14 and 25 a washer between nut 24 and the top of the upper member 20.

The caster is applied to the leg 10 as follows:

The entire assembly is completed as shown in Fig. 1. The two wedge members 20 are then slightly turned upon their longitudinal axes until the lateral distance between their long sides is just enough to cause frictional engagement of these sides with the inside diameter of the leg 10. The assembly is then inserted into the leg and the caster by hand, given a rotary movement. This will screw the caster stem 14 further into the nut 24 which does not turn because of being frictionally held in contact with the washer 25 and the top wedge member 20. This rotary movement then causes the two wedge members 20 by reason of their oblique contacting surfaces 22 to be drawn towards each other which increases the pressure of its long sides against the inner side walls of the leg 10 until the members are securely locked to the walls by frictional contact therewith.

The inner bores 23 of the wedge members 20 are made large enough to permit the lateral sliding motion of the members without placing any strain upon the caster stem 14. The washer 19 serves the purpose of keeping the caster stem 14 and thereby the caster 11 in a position central with respect to the tubular leg 10.

In order to remove the caster from the leg, it is only necessary to turn the caster in a direction opposite to the one described above when the wedge members 20 will become disengaged from the inner side walls of the leg and when the entire assembly can readily and easily be extracted therefrom.

In Fig. 5 I have shown a modified form of caster retainer. In this form a caster stem 14a is part of a roller caster 11a of a construction well known in the art. Those parts of this modified form of retainer which are identical to and function the same as parts used in the retainer illustrated in Figs. 1 to 4 are numbered correspondingly. Instead of washers 17 and 19, I am using a washer 17a which has a stepped upper portion 19a to fit closely the inner side walls of the leg 10. 26 is a tubular housing over the wedge members 20, made preferably of rubber, or other elastic material. By means of this elastic jacket 26 I provide a somewhat better contact between the retainer and the leg. In all other respects the operation of assembling the retainer, inserting or withdrawing it from the leg 10 is identical with the method before described.

In Fig. 6 I have shown a stem 14b having its outer end fashioned hook-like at 14c and a projection 19b to fit the recess or socket within which the device is to be inserted. This modification illustrates the principles of the invention employed to retain devices other than casters to sockets. The methods of application are the same as the ones described before.

In Fig. 7 a cross-section of a wedge member 20 is shown changed from a cylindrical to a square shape. By this change I obtain two separated points of contact 20a between the inner side wall of the leg and each of the members 20. This figure shows in dotted lines the inner diameter of the leg 10 and the caster stem 14.

In Fig. 8, a further modification of the cross-section of the wedge member 20 is shown. In this form, one side of the member is curved at 20b providing a wider contact surface with the inner side wall of the leg 10. The bore 23 has been changed to a slot 23b.

The applications of the wedge members 20 as modified in Figs. 7 and 8 are also identical with the ones described in connection with the other figures.

The wedge members may be made of metal, fiber, or even rubber or other elastic material, the important object to be achieved being frictional contact with the side walls of a socket by drawing their inclined surfaces together by a simple turning movement.

While I have shown in the drawing and described in the specification several preferred embodiments of my invention, I do not wish to limit myself to the particular construction disclosed, but wish it to be understood that various changes in the form, proportion and combination of parts and minor details of construction may be resorted to without departing from the principles or sacrificing any of the advantages of the invention, as defined in the appended claims.

What I claim as new, is:

1. Mechanism for retaining casters or the like in a socket comprising a stem, a plurality of wedge members having contacting inclined surfaces loosely supported upon the stem, an elastic jacket around the wedge members, and means to draw the members together to cause frictional engagement between the jacket and the socket.

2. In a retaining mechanism of the kind described, a plurality of wedge members each having a base at right angles to its longitudinal axis and a top in angular relation to the base, each member having a substantially polygonal cross-section, and means to draw the members together.

3. In a retaining mechanism of the kind described, a wedge member having a base at right angles to its longitudinal axis and a top in a plane inclined to the base, the member having a limited peripheral portion of its side wall of arcuate shape.

4. Mechanism for retaining casters or the like in a socket comprising a central stem, a plurality of wedge members of identical structure having contacting inclined surfaces, and means to draw the members together to cause frictional engagement between the sides of the members and the socket.

HARRY M. EPSTEIN.